(12) United States Patent
Mullins et al.

(10) Patent No.: US 10,977,428 B2
(45) Date of Patent: Apr. 13, 2021

(54) CONTENT TRANSFORMATIONS

(71) Applicant: Microsoft Technology Licensing, LLC, Redmond, WA (US)

(72) Inventors: Christopher Lee Mullins, Sammamish, WA (US); Jonathan Edgar Fay, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 714 days.

(21) Appl. No.: 14/754,496

(22) Filed: Jun. 29, 2015

(65) Prior Publication Data
US 2016/0378733 A1 Dec. 29, 2016

(51) Int. Cl.
*G06F 40/151* (2020.01)
*G06F 3/0484* (2013.01)
*G06F 40/58* (2020.01)
*G06F 40/131* (2020.01)
*G06F 40/197* (2020.01)

(52) U.S. Cl.
CPC ........ *G06F 40/151* (2020.01); *G06F 3/04847* (2013.01); *G06F 40/131* (2020.01); *G06F 40/197* (2020.01); *G06F 40/58* (2020.01)

(58) Field of Classification Search
CPC ...... G06F 17/24; G06F 17/211; G06F 17/248; G06F 17/2229; G06F 17/2264; G06F 17/2282; G06F 17/30011
See application file for complete search history.

(56) References Cited

U.S. PATENT DOCUMENTS

| | | | | |
|---|---|---|---|---|
| 5,734,905 A | * | 3/1998 | Oppenheim | G06F 3/0486 719/315 |
| 5,900,874 A | * | 5/1999 | Shrader | G06F 3/0486 715/846 |
| 6,694,310 B1 | * | 2/2004 | Yu | G06F 17/30463 707/718 |
| 6,920,608 B1 | * | 7/2005 | Davis | G06F 17/2247 715/209 |
| 8,190,619 B2 | | 5/2012 | Lehtipalo et al. | |
| 8,191,005 B2 | | 5/2012 | Baier et al. | |
| 8,412,675 B2 | | 4/2013 | Alvarado et al. | |
| 8,484,553 B2 | | 7/2013 | Lloyd et al. | |
| 8,677,235 B2 | | 3/2014 | Chronister et al. | |
| 8,825,649 B2 | | 9/2014 | Heimendinger et al. | |

(Continued)

OTHER PUBLICATIONS

"CAR Hand-on: Simile Exhibit Framework," Published on: Feb. 13, 2013 Available at: http://people.csail.mit.edu/karger/Exhibit/CAR/HandsOn/.

(Continued)

*Primary Examiner* — Maikhanh Nguyen
(74) *Attorney, Agent, or Firm* — Michael Best & Friedrich LLP

(57) ABSTRACT

A facility for authoring a document is described. The facility receives first user input that identifies content to be included in the document. The identified content is in a first form. The facility also receives second user input that specifies a transformation operation to be performed on the identified content in order to transform the identified content from the first form into a second form. The facility applies the specified transformation operation to transform the identified content from the first form into the second form for display.

23 Claims, 22 Drawing Sheets

(56) References Cited

U.S. PATENT DOCUMENTS

| | | | | |
|---|---|---|---|---|
| 2002/0107838 A1* | 8/2002 | Tsai | ................ | G06F 17/30864 |
| 2003/0041095 A1* | 2/2003 | Konda | .............. | G06F 17/30569 |
| | | | | 709/201 |
| 2007/0150807 A1* | 6/2007 | Harrington | ....... | G06F 17/30011 |
| | | | | 715/234 |
| 2008/0294420 A1* | 11/2008 | Eilam | ...................... | G06F 8/10 |
| | | | | 703/22 |
| 2013/0139053 A1 | 5/2013 | Le Chevalier et al. | | |
| 2013/0249917 A1 | 9/2013 | Fanning et al. | | |
| 2014/0250394 A1 | 9/2014 | Han et al. | | |
| 2015/0033173 A1 | 1/2015 | Im et al. | | |

OTHER PUBLICATIONS

Satyanarayan, et al., "Declarative Interaction Design for Data Visualization," Proceedings of the 27th annual ACM symposium on User interface software and technology, Oct. 5, 2014, 10 pages.

"Data-Driven Documents," Retrieved on: Feb. 27, 2015 Available at: http://d3js.org/.

Jong, Jos DE, "Timeline Documentation," Published on: Apr. 13, 2013 Available at: http://almende.github.io/chap-links-library/js/timeline/doc/.

Khan, et al., "Data and Information Visualization Methods, and Interactive Mechanisms: A Survey," In Proceedings of International Journal of Computer Applications, vol. 34, Issue 1, Nov. 2011, 14 pages.

Yi, et al., "Toward a Deeper Understanding of the Role of Interaction in Information Visualization," In Journal of IEEE Transactions on Visualization and Computer Graphics, Nov. 1, 2007, 8 pages.

* cited by examiner

300

301 Thank you for buying this Microsoft product! We value your business.

*FIG. 3* fragment version instance directory table — 1000

| fragment version ID | server ID | |
|---|---|---|
| 12345498 | 9103 | — 1001 |
| 12345498 | 1231 | — 1002 |
| 91285817 | 9103 | — 1003 |
| 91285817 | 2254 | — 1004 |
| 65489151 | 4545 | — 1005 |
| 65489151 | 9103 | — 1006 |
| 84321332 | 1231 | — 1007 |
| 84321332 | 4658 | — 1008 |

— 1011  — 1012

*FIG. 10* fragment version instance content table — 1100

| fragment version ID | update time | fragment contents | |
|---|---|---|---|
| 91285817 | 1/16/1987 16:02:54 | <image data> | — 1101 |
| 65489151 | 9/15/2002 9:17:12 | Microsoft Corporation . . . | — 1102 |
| 12345498 | 1/3/2001 10:32:19 | Microsoft Corp. . . . | — 1103 |

Alpha Project

2016 Q1 Fundraising Goals:

| | A | B | |
|---|---|---|---|
| 1 | January | $1,000 | —1311 |
| 2 | February | $2,000 | —1312 |
| 3 | March | $6,000 − B1 − B2 = $3,000 | —1313 |

*FIG. 13*

Alpha Project

2016 Q1 Fundraising Goals:

|   | A | B |
|---|---|---|
| 1 | January | $1,000 |
| 2 | February | $3,000 |
| 3 | March | $6,000 – B1 – B2 = $2,000 |

*FIG. 17*

CONTENT TRANSFORMATIONS

BACKGROUND

It is common for electronic documents to be rigorously categorized into types: word processing documents containing mostly text; spreadsheets containing mostly numbers and formulae organized into a grid; slideshow documents organized into a sequence of slides having room for minimal content based on the typical need for them to be legible at a distance; business drawings in which text is associated with shapes connected in a particular configuration, etc. This rigorous categorization is related to the fact that different documents of different types are typically created and edited using different, monolithic applications. For example, word processing documents tend to be created and edited using a different application than spreadsheet documents.

BRIEF DESCRIPTION OF THE DRAWINGS

FIGS. 3-5 are display diagrams showing the editing and display of a document incorporating a shared document fragment.

FIG. 10 is a table diagram showing sample contents of a fragment version instance table used by the facility in some embodiments to store information about fragment version instances.

FIG. 11 is a table diagram showing sample contents of a fragment version instance content table used by the facility in some embodiments to store fragment version instance content.

FIG. 13 is a display diagram showing a materialized view of the report document whose fragment graph is shown in FIG. 12.

FIG. 17 is a display diagram showing a rematerialized view of the document reflecting the removal of the table to bar graph lens from the fragment graph.

SUMMARY

Figure 1:
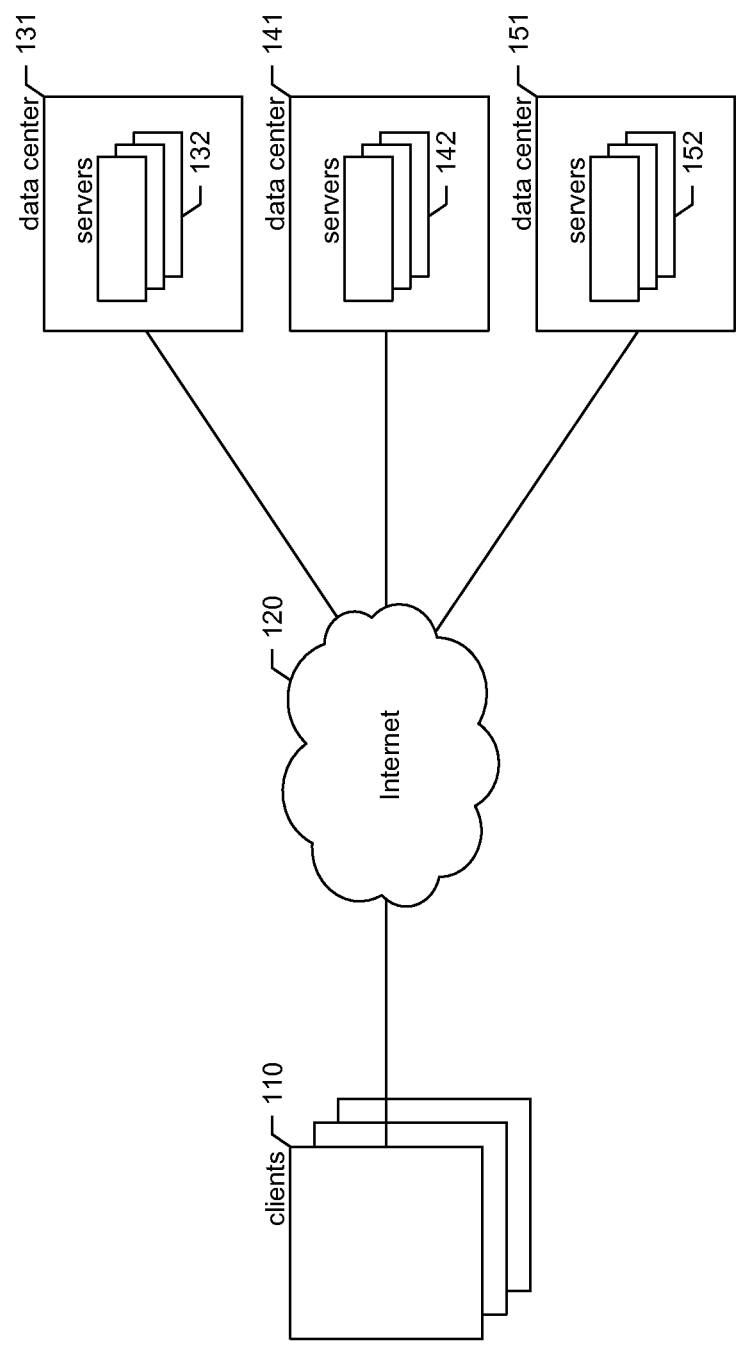
FIG. 1 is a network diagram showing the environment in which the facility operates in some embodiments.

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for authoring a document is described. The facility receives first user input that identifies content to be included in the document. The identified content is in a first form. The facility also receives second user input that specifies a transformation operation to be performed on the identified content in order to transform the identified content from the first form into a second form. The facility applies the specified transformation operation to transform the identified content from the first form into the second form for display.

DETAILED DESCRIPTION

Overview

The inventors have recognized significant disadvantages in conventional electronic documents. In particular, the inventors have noted that conventional documents are in many cases too rigid, in that they tend to be limited to certain kinds of content expressed in certain ways.

In order to overcome these disadvantages, the inventors have conceived and reduced to practice a software and/or hardware facility for transforming document contents ("the facility"). In some embodiments, the facility enables users to apply transformational "lenses" of various types to portions of content in a document to change the form of this content. In response to the application of each lens, as part of materializing the document for display, the facility applies the corresponding transformation to the selected content.

In various embodiments, the facility provides lenses for various types of transformations. As examples, in various embodiments, the facility provides lenses for transformations such as transformations performing natural language translation between pairs of natural languages, such as English and Spanish; transformations performing natural language parsing; transformations performing natural language summarization; transformations extracting headings from text in order to provide highlights of the text; transformations of content of various types into a sequence of slides; transformations that transform between discrete character-based text, handwriting, and/or speech; transformations between tables of numbers and/or formulae and various sorts of charts and graphs, including, for example, bar graphs, line graphs, scatter graphs, pie charts, etc.; transformations that alter formatting characteristics, such as font, color, italics, etc.; transformations that populate additional content, such as transformations that perform queries based upon original content of the document to retrieve additional related information to add to the document. The facility is extensible, in that new lenses may be added over time. For example, a new lens may be added to allow existing content to be transformed in a new way.

In various embodiments, the facility provides various user interface techniques for imposing, rearranging, and removing lenses from portions of content. In some embodiments, where a user transfers content into a document such as by dragging, copying-and-pasting, etc., the facility provides one or more user interface techniques for specifying lenses that are to be imposed on the transferred content. In some embodiments, the facility permits the user to select an arbitrary portion of content in a document and impose one or more lenses on the selected content. In some embodiments, the facility displays in the context of the literal contents of a document visual indications of lenses that have been imposed on portions of it, with which users can interact to alter the lenses. In some embodiments, the facility displays visual indications of lenses imposed on portions of a document's content in the context of a structural organization or representation of the document, such as an outline of the document, or such as the fragment graphs discussed in additional detail below. In some embodiments, the facility provides a user interface in which users can drag lenses into, out of, and to different locations within various representations of the document, such as from a lens palette.

In some embodiments, the facility permits a sequence of lenses to be "stacked" in their imposition on a particular portion of content, such that multiple transformations are performed on the same content. In some embodiments, a user may specify the order in which a stack of lenses is imposed. In some embodiments, the facility infers an order in which to impose lenses in a stack.

In some embodiments, a user may edit a version of content that has been transformed via one or more lenses, and affect the underlying data in a variety of ways. For example, for values in a table that are transformed via a particular kind of lens into a bar chart, the user may manipulate the height of the bars in the bar chart, thus changing the underlying values. If the lens is subsequently removed, the user will see that values in the table have been updated to reflect the changed height of the corresponding bars in the bar chart.

In some embodiments, the facility stores documents using a construct called a "document fragment," or simply "fragment," which is a unit of document content represented separately by the facility. The document is comprised of a single "root fragment," which can directly contain content, as well as containing fragment references referring to other fragments. Those fragments referred to by the root fragment can themselves directly contain content and fragment references to other fragments, and so on. When a document is opened, the facility typically collects and synthesizes its contents by retrieving the root fragment, retrieving other fragments referred to by fragment references in the root fragment, retrieving further fragments referred to by fragment references in those fragments, and so on. In some embodiments, any fragment can be treated as a document, in the sense that it can be opened by an editing or presentation application as the root fragment.

In some embodiments, the facility stores the fragments making up users' documents in a cloud-based service, where they can be accessed from virtually any location. In some embodiments, this cloud-based service uses a technique called "erasure coding" in which it decomposes, or "shreds," a fragment defined by a document author into multiple smaller constituent pieces, or "shreds," each of which the facility stores on multiple storage devices in different data centers in different geographic locations to provide disaster and outage survivability. When the cloud-based service receives a request for a fragment, it retrieves and combines these shreds to reconstitute the fragment.

In some embodiments, the facility stores a new version of a fragment to reflect each editing action performed on the fragment, each identified by the date and time at which the editing action was performed. For example, in some embodiments, the facility creates a new fragment version for each character or group of characters that is inserted in the fragment—such as by a keystroke or a text block paste—and for each character or group of characters that is deleted—such as by a backspace keypress or a select-and-delete operation. In some embodiments, each fragment version identifies the author that took the editing action reflected by the fragment version. In some embodiments, after being written, these fragment versions cannot be altered, and are said to be "immutable."

In some embodiments, over time, the facility deletes some of the versions of a fragment, so as to collapse two or more editing actions into an undeleted version of the fragment. In some embodiments, in doing so, the facility deletes only contiguous fragment versions all reflecting editing actions by the same author and immediately preceding an undeleted fragment version also reflecting an editing action by the same author.

In some embodiments, where the content is incorporated from a fragment-aware source document, the facility ensures that the incorporated content corresponds precisely to one or more whole fragments; that is, where the selected content spans only a portion of a fragment in the source document, the facility breaks that fragment in the source document into two fragments, a first that contains only the content from the original fragment that was selected, a second containing the content from the original fragment that was not selected, so that the first can be incorporated into the target document while the second is not. Where the content is incorporated from a fragment-unaware source document, the facility creates a new fragment to contain the incorporated content.

In response to the incorporation operation, the facility creates a fragment reference in the target document at the position in the target document where the content was incorporated to represent the incorporated content in the target document. In some embodiments, the fragment reference contains multiple components, such as a current fragment ID component and/or an original component. The current fragment ID component of the created fragment reference identifies the fragment to which the reference refers, such as by containing a fragment ID for this fragment that can be used to retrieve this fragment. The origin component, where used by the facility, maintains in the fragment reference state the fragment ID of the fragment in which the incorporated content originated, which can serve as a basis for changing the mode in which the incorporated content is used in the target document throughout the life of the fragment reference, and for tracking the provenance of the fragment. In some embodiments, the facility stores an ordered list of fragment IDs in the origin component to reflect the series of fragments from which the referenced fragment has been forked.

In various embodiments, at the time the user performs the incorporation operation, the user can specify an initial mode for the incorporated content in the target document by, for example, holding down a certain keyboard key during the drag interaction, using a varying control key combination to paste the incorporated content into the target document, responding to a context menu or dialog displayed by the facility in response to the incorporation operation, etc. In some embodiments, each mode has two characteristics: (1) whether the contents of the fragment are editable in the context of the incorporating document or fragment ("editable in context") and (2) how a version of the referenced fragment is chosen for inclusion in the incorporating document or fragment ("version selection"). In some embodiments, the following kinds of version selection options are available: (a) "latest"—the version of the fragment with the most recent time is incorporated by the reference; (b) "time-specified"—a particular version of the fragment associated with a particular time is incorporated by the reference (e.g., in some embodiments, an arbitrarily specified time causes selection of the fragment version whose time is the latest among the fragments that are not later than the specified time); (c) "special"—special rules are used to specify which version of the fragment is selected for incorporation. Examples of special rules are the latest document approved by a qualified approval authority, or the earliest version embodying an edit by a particular author.

In various embodiments, the facility supports some or all of the following incorporation modes: live mode, follow mode, forkable mode, pinned mode, special forkable mode, and special follow mode.

Live mode (1) is editable in context and (2) uses "latest" version selection. Thus, in live mode, an author can change the content of the fragment, which results in a new version of the fragment being created to reflect each such change. These changes will appear in any other containing fragments that incorporate the same fragment, and whose version selection option ends up selecting this version, either (a) latest, or (b) special with a selection rule that selects this version. Live mode is typically used for a reference included to both revise the referenced fragment, and reflect the revisions of others. By virtue of using the latest version selection option, a reference in live mode incorporates the latest version of the fragment, no matter its content or which authors' revision it reflects. Where live mode is selected, the facility populates a current fragment ID component of the fragment reference with the same fragment ID as the origin component. The current component of the fragment reference identifies the fragment whose contents are to be retrieved for inclusion in the target document.

Follow mode (1) is not editable in context, and (2) uses latest version selection. In follow mode, the latest version of the fragment is always incorporated, but can't be edited in the context of the document or fragment containing the follow mode reference. Follow mode is typically used to incorporated dynamic content maintained by one or more other authors, in a centralized manner.

Forkable mode (1) is editable in context, and (2) uses time-specified version selection. In forkable mode, the fragment can be edited in the context of the reference from the fragment's state at the specified time. Performing such an edit transforms the reference from forkable mode to live mode; reflects the edit in the first version of a new fragment ID; stores the new fragment ID in the context of the reference; and stores the original fragment ID in the reference's origin component. Forkable mode is typically used where a particular state of a fragment is to be the basis for a new set of edits that won't affect documents or fragments incorporating the original fragment. Similarly, the forkable and resulting live reference aren't affected by edits to the original fragment subsequent to the forkable reference version selection time.

Pinned mode (1) is not editable in context, and (2) uses time-specified version selection. While the fragment reference is in pinned mode, the incorporated content cannot be changed, either by a user editing the document or fragment containing the pinned reference (because not editable in context precludes editing by such an author), or by a user editing the fragment in the context of a different containing document or fragment (because such edits will be reflected in a new version of the fragment, which will not be selected by the time-specified selection logic of this reference). Where pinned mode is selected, the facility populates the current component of the fragment reference with the fragment ID of the origin fragment. Pinned mode is typically used to preserve a particular state of the fragment in the referring document.

Special forkable mode (1) is editable in context, and (2) specifies a special version selection rule. The incorporated fragment will, at any given time, show the content of the version of the source fragment that is selected by the special version selection rule at the time. When an author edits the fragment in context, the forking process described above occurs. Special forkable mode can be used, for example, to use an evolving template whose edits are subject to periodic approval as a basis for creating instances of new content.

Special follow mode (1) is not editable in context, and (2) specifies a special version selection rule. Thus, a special follow reference shows the version of the fragment that satisfies the version selection rule at any given time, which is not editable in context. This mode can be used, for example, to pull into a document or fragment centrally-authored content that is periodically rereleased by its authors to reflect all edits occurring since the last release.

A user may at any subsequent time change the mode of the incorporated content via various user interface techniques, such as by right-clicking on the incorporated content and selecting an item from a resulting context menu, selecting incorporated content and choosing a menu-bar menu item, interacting with a specialized control that is displayed when the mouse cursor hovers over the incorporated content, etc. In some embodiments, the facility incorporates or interoperates with a system of authority and access controls and other content governance measures limit the actions that can be taken by a particular user with respect to a particular document or fragment in various circumstances, including changing the mode of an existing fragment reference.

In some embodiments, when retrieving the time-specified fragment version for content incorporated in pinned mode, the facility notifies the user if a version of the origin fragment that is more recent than the read-only fragment to enable the user to switch the mode to live, or remain in pinned mode but replace the time specified for the version in the reference with the time corresponding to the latest version.

In some embodiments, the facility maintains metrics on the incorporation of fragments into documents to be able to report on various "hot fragments" measures, which identify fragments that are incorporated into the most total documents, or fragments that have been incorporated into the most documents during a recent period of time, across an organization or another group of users, among a group or category of documents, etc.

By operating in some or all of the ways described above, the facility enables users to easily, intuitively, and flexibly transform various portions of a documents contents in various ways.

Hardware

FIG. 1 is a network diagram showing the environment in which the facility operates in some embodiments. The network diagram shows clients 110 each being used by a different user. Each of the clients executes software enabling its user to create, revise, and present electronic documents. Software on the client also enables the client to retrieve and synthesize remotely-stored document contents, including document fragments. In particular, the Internet 120 or one or more other networks connect each of the clients to a number of different data centers, e.g., data centers 131, 141, and 151, which in some embodiments are distributed geographically to provide disaster and outage survivability, both in terms of data integrity and in terms of continuous availability. Distributing the data centers geographically also helps to minimize communications latency with clients in various geographic locations. Each of the data centers contain servers, e.g. servers 132, 142, and 152. The servers access storage devices containing document contents, including document fragments, and execute software for responding to requests from clients and other servers to store and retrieve document contents, again including document fragments. In various embodiments, the facility uses various different distributions of responsibility for retrieving and combining document fragments between the clients and the servers.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different devices may be used as clients, including desktop computer systems, laptop computer systems, automobile computer systems, tablet computer systems, smart phones, personal digital assistants, televisions, cameras, etc.

Figure 2:
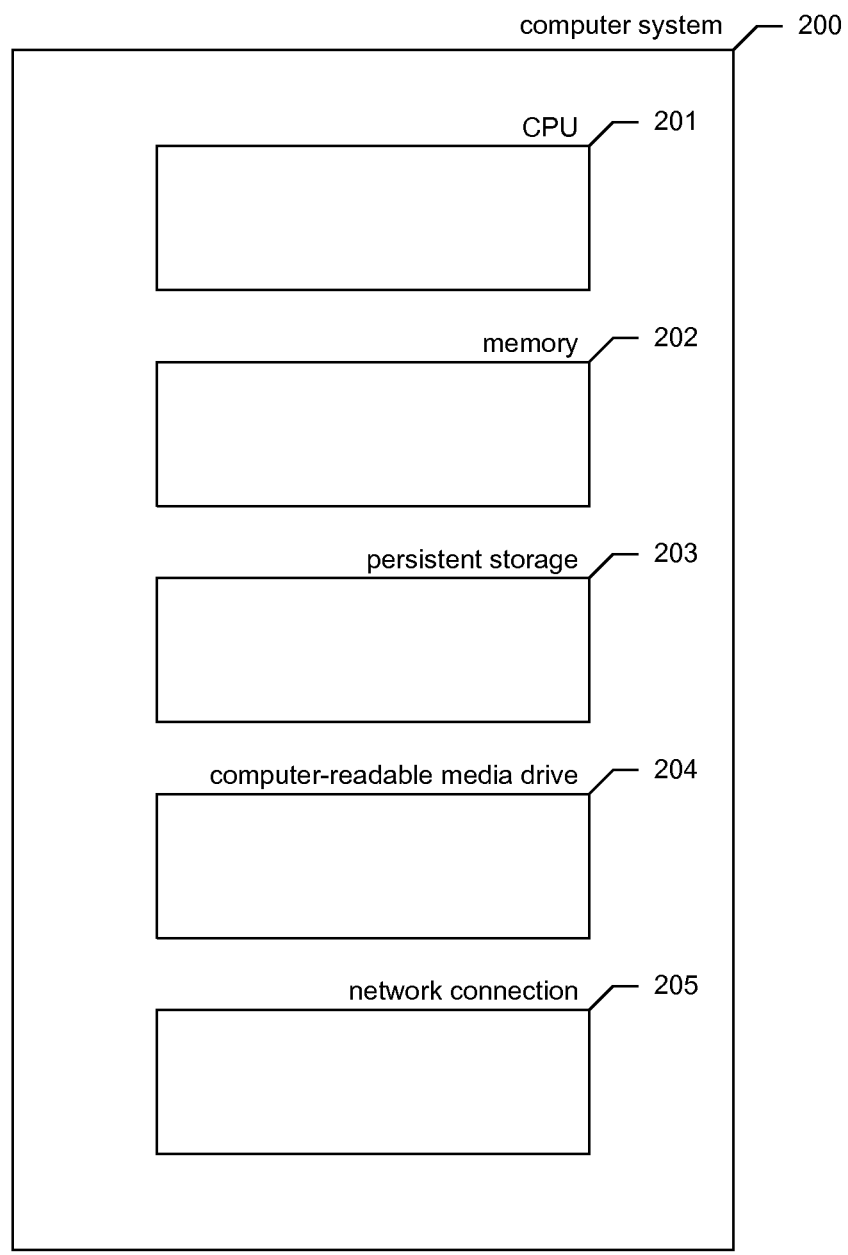
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Fragment Management

Figure 5:
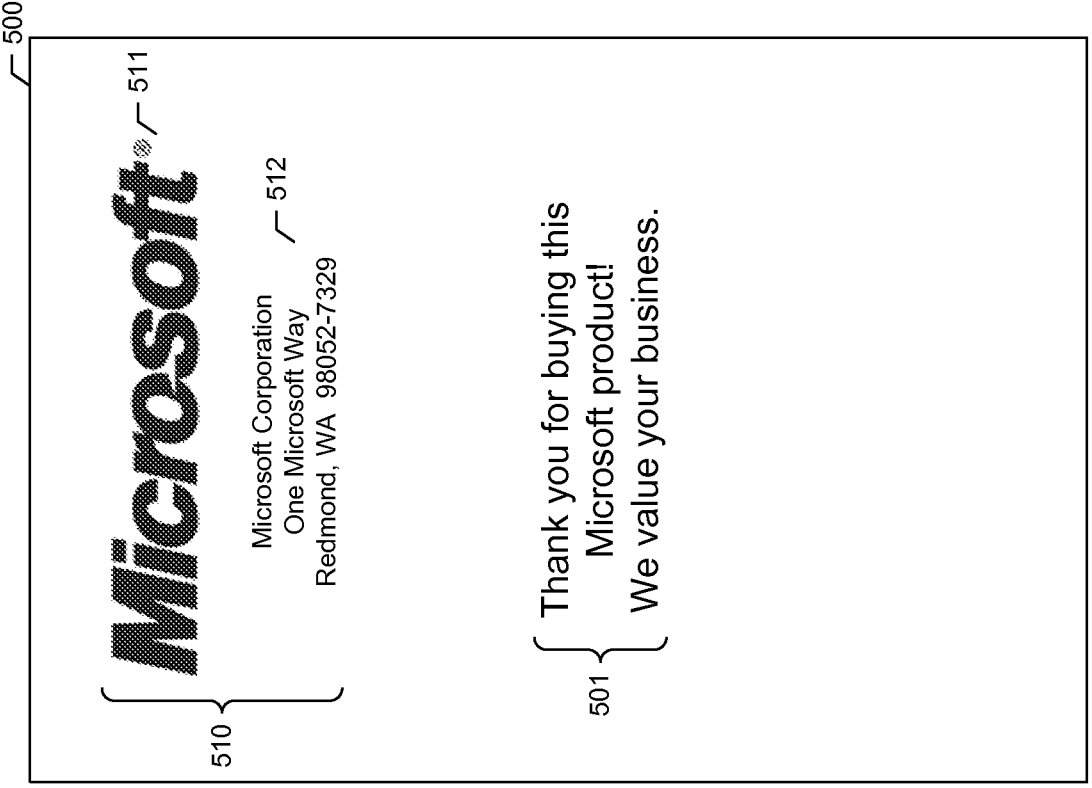
Figure 4:
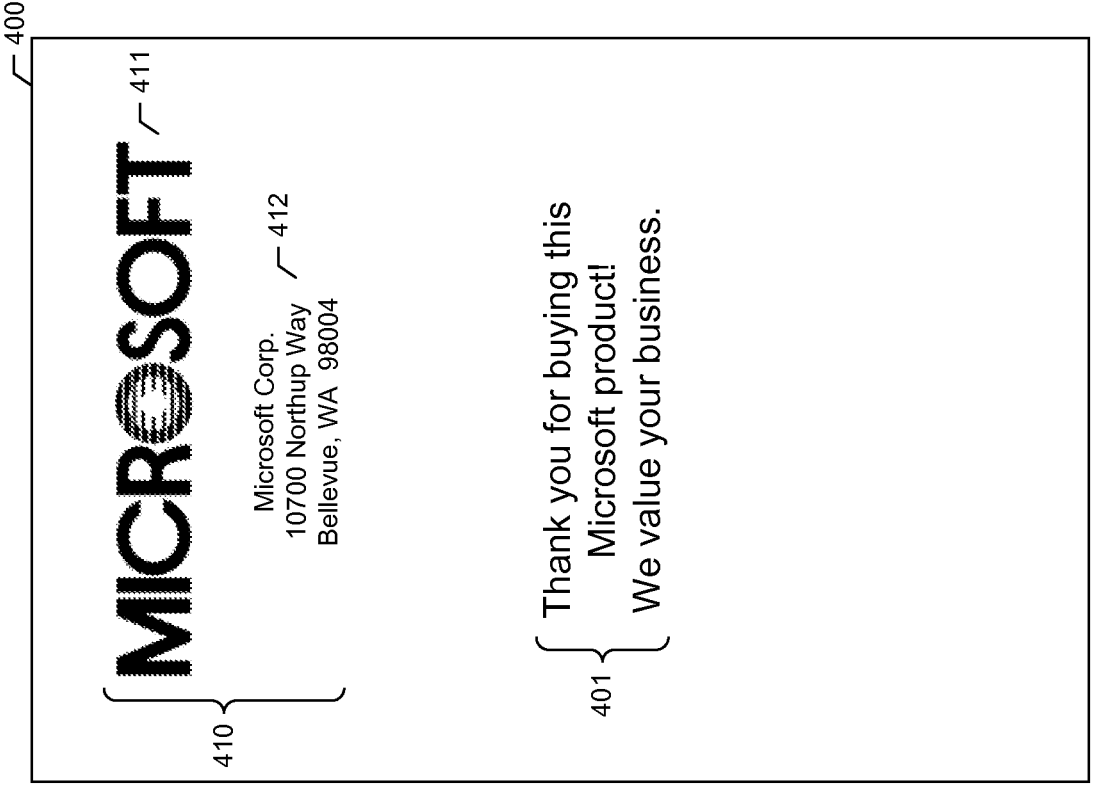

FIGS. 3-5 are display diagrams showing the editing and display of a document incorporating a shared document fragment. FIG. 3 is a display diagram showing a sample target document at a time before the shared document fragment is incorporated. The target document 300 includes text 301. This text may be directly contained by the root fragment for the target document, or may be contained by a fragment identified by a fragment reference within the root fragment for the target document.

FIG. 4 is a display diagram showing the sample target document at a time immediately after the shared document fragment is incorporated. At this time, the target document 400, in addition to containing text 401, contains incorporated content 410 transferred from a source document (not shown). The incorporated content constitutes a company's letterhead, including both an image 411 of the company's logo and the company's textual address 412.

Where the user incorporates the letterhead content in pinned mode, the letterhead content will remain unchanged in the target document unless and until the incorporation is changed to a different mode. Where the user incorporates the letterhead content in forked mode, the user can change the letterhead content in the context of the target document; such changes will not affect the letterhead content in the source document, and any changes to letterhead content in the source document will not be reflected in the target document. Where the user incorporates the letterhead content in live mode, the user can, subject to any applicable permissions, change the letterhead content in the context of the target document, and doing so will change the letterhead content in the source document and any other document that incorporates the letterhead content in live mode. Similarly, changes to the letterhead content via the source document or any other document that incorporates the letterhead content in live mode will be reflected in the target document.

FIG. 5 is a display diagram showing the sample target document where, after the shared document fragment is incorporated into the target document in live mode, the content is changed in the context of the source document, such as by another user. It can be seen that, in the target document 500 at this time, the letterhead content 510 contains a new company logo 511 and a new company address 512, both substituted in the context of the source document, and reflected in the target document pursuant to the target document's incorporation of this content in live mode.

Figure 6:
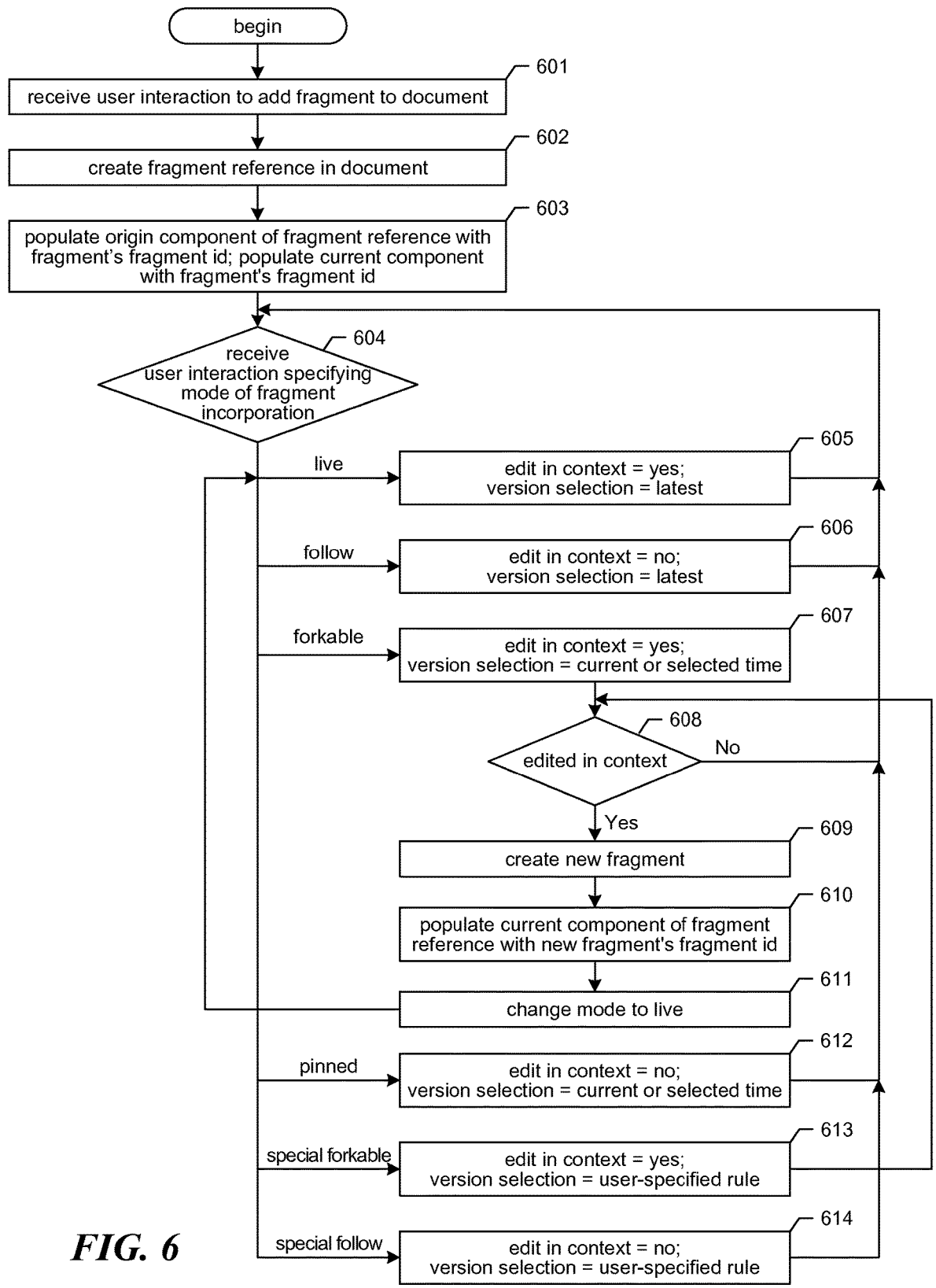
FIG. 6 is a flow diagram showing steps typically performed by the facility in some embodiments in order to incorporate a document fragment into a document, and adjust the mode of its incorporation.

FIG. 6 is a flow diagram showing steps typically performed by the facility in some embodiments in order to incorporate a document fragment into a document, and adjust the mode of its incorporation. In step 601, the facility receives a user interaction to add a fragment to a target document. In various embodiments, such interactions can be, for example, copying the selected content onto the clipboard, then pasting it into the target document at the target position; dragging the selected content from the source document to the target position in the target document; etc. Where the user selects content to add to the target document that don't exactly correspond to whole existing fragments, the facility creates one or more fragments to which the selected content does exactly correspond, such as by subdividing fragments that occur in the source document. In some cases, this involves altering and/or adding fragment references in the source document, and in one or more other documents incorporating the same content in live mode.

In step 602, the facility creates a fragment reference in the target document. In step 603, the facility populates both the origin component of the fragment reference and its current component with the fragment ID of the fragment added to the document. In step 604, the facility receives a user interaction specifying a mode for incorporating the fragment in the target document. In some embodiments, a single interaction or a related sequence of interactions can both add the fragment to the document and specify a mode. If the user action received in step 604 specifies the live mode, then the facility continues in step 605; if it specifies the follow mode, then the facility continues in step 606; if it specifies the forkable mode, then the facility continues in step 607; if it specifies the pinned mode, then the facility continues in step 612; if it specifies the special forkable mode, then the facility continues in step 613; and if it specifies the special follow mode, then the facility continues in step 614.

In step 605, where the live mode is specified, the facility sets edit in context to yes for the reference, and sets version selection to latest. After step 605, the facility continues in step 604 to permit the user to, at a later time, specify a new mode for this fragment. In step 606, where the follow mode is specified, the facility sets edit in context to no for the reference, and sets version selection to latest. After step 606, the facility continues in step 604. In step 607, where the forkable mode is specified, the facility sets edit in context to yes for the reference, and sets version selection to the current time, or an earlier time selected by the user. In step 608, if the user chooses to edit the fragment in the context of the reference, then the facility continues in step 609, else the facility continues in step 604. In step 609, the faculty creates a new fragment that reflects application of the edit of step 608 to the added fragment. The new fragment has a different fragment ID than the added fragment. In step 610, the facility populates the current component of the fragment reference with the new fragment's fragment ID. In step 611, the facility changes the reference's mode to live. After step 611, the facility continues in step 605. In step 612, where the pinned mode is specified, the facility sets edit in context to no for the reference, and sets version selection to the current time, or to an earlier time selected by the user. After step 612, the facility continues in step 604. In step 613, where the special forkable mode is specified, the facility sets edit in context to yes, and sets version selection to a version selection rule, such as a version selection rule specified via additional user interactions, a default version selection rule, an inferred version selection rule, etc. After step 613, the facility continues in step 608. In step 614, where the special follow mode is specified, the facility sets edit in context to no, and sets version selection to a version selection rule in a manner similar to step 613. After step 614, the facility continues in step 604.

Those skilled in the art will appreciate that the steps shown in FIG. 6 and in each of the flow diagrams discussed below may be altered in a variety of ways. For example, the order of the steps may be rearranged; some steps may be performed in parallel; shown steps may be omitted, or other steps may be included; a shown step may be divided into sub steps, or multiple shown steps may be combined into a single step, etc.

Figure 7:
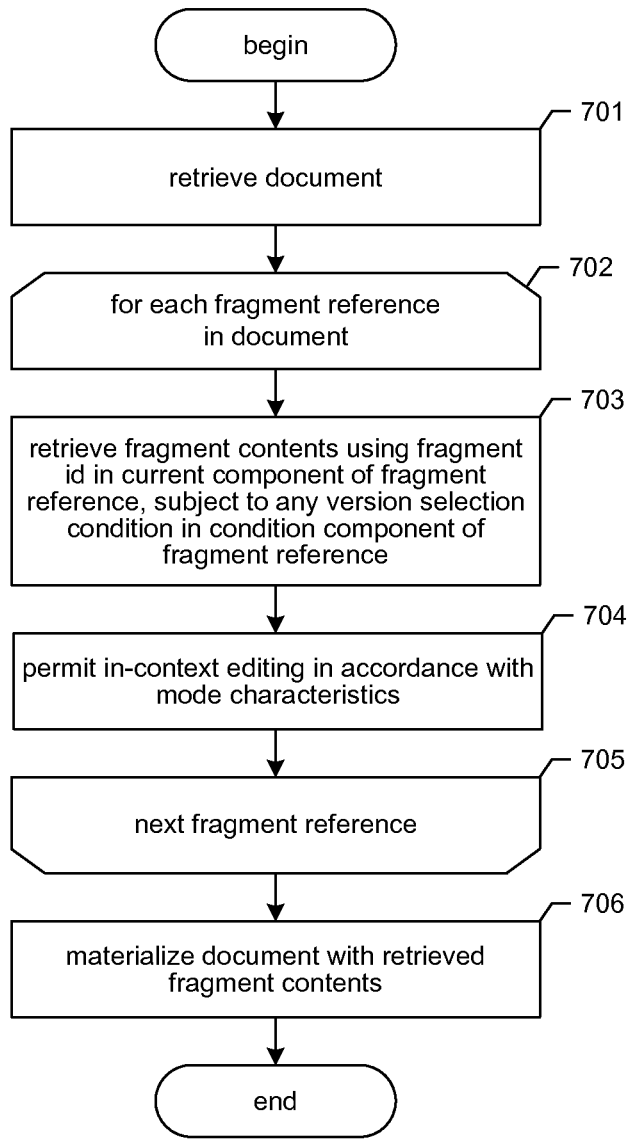
FIG. 7 is a flow diagram showing steps typically performed by the facility in some embodiments in order to materialize a document containing shared fragments.

FIG. 7 is a flow diagram showing steps typically performed by the facility in some embodiments in order to materialize a document containing shared fragments. In various embodiments, the facility performs these steps when a document is opened, when a document needs to be displayed, when a user attempts to add it to document, etc. In various embodiments, the facility's performance of these steps is distributed between the client and servers in various ways. In step 701, the facility retrieves a document, such as by retrieving its root fragment. The facility loops through steps 702-704 for each fragment reference occurring in the document, including transitive fragment references from one fragment to another. In step 703, the facility retrieves content of the fragment using the fragment ID contained in the current component of the fragment reference. This retrieval is subject to any version selection condition contained in the condition component of the fragment reference; that is, the retrieval is performed with respect to the latest version of the fragment that specifies any contained version selection condition, or, absent a version selection condition, the latest version of the fragment. In various embodiments, the facility uses various forms of fragment version selection logic. In some embodiments, the process of retrieving a fragment indicates permissions associated with the fragment, including whether the fragment can be edited by the current user, which the facility uses to indicate and control whether the user can edit the fragment in the context of the document. Fragment retrieval is discussed in greater detail below in connection with FIGS. 8-11. In step 704, the facility makes the fragment editable in context based on the mode of the fragment reference. In step 705, if additional fragment references remain to be processed, then the facility continues in step 702 to process the next fragment reference, else the facility continues in step 706. In step 706, the facility materializes the document using the fragment contents retrieved in step 703. After step 706, these steps conclude. In some embodiments (not shown), rather than performing the processing shown in FIG. 7 in a loop, the facility performs it as a recursive descent of a tree-like graph with lenses acting as parents of content nodes, and modifying rendering behavior as the document is materialized.

Figure 8:
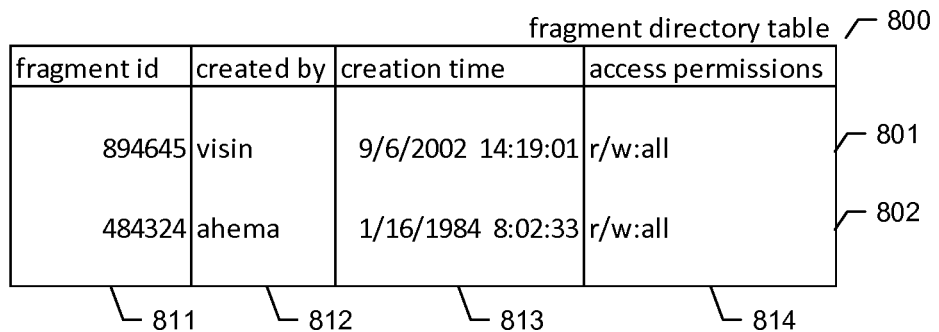
FIG. 8 is a table diagram showing sample contents of a fragment directory table used by the facility in some embodiments to store information about fragments.
Figure 9:
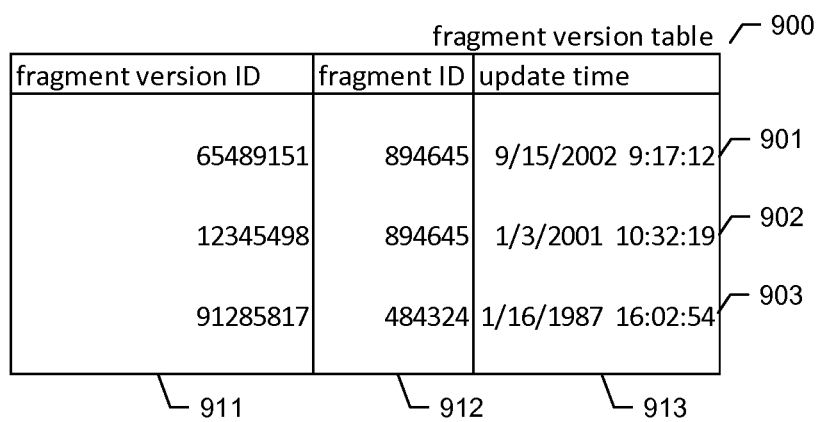
FIG. 9 is a table diagram showing sample contents of a fragment version table used by the facility in some embodiments to store information about fragment versions.

FIG. 8 is a table diagram showing sample contents of a fragment directory table used by the facility in some embodiments to store information about fragments. In some embodiments, the fragment directory table, and the other tables described in FIGS. 9-11, are stored in a data center on a storage device accessible to servers executing server software that is part of the facility. In some embodiments, some or all of these tables are stored in multiple data centers in order to provide survivability and a measure of locality for the data they store. The fragment directory table 800 is made up of rows such as rows 801-802 each corresponding to a different fragment. Each row is divided into the following columns: a fragment ID column 811 containing a fragment ID identifying the fragment to which the row corresponds; a created by column 812 containing information identifying a user that created the fragment; a creation time column 813 having contents indicating the time at which the fragment was created; and an access permissions column 814 specifying the ways in which the fragment can be accessed by various users. For example, row 801 indicates that a fragment having fragment ID 894645 was created by user visin at 9/6/2002 14:19:01, and can be read and written by all users. In some embodiments, the facility employs geographically-invariant times, such as times expressed in Greenwich Mean Time, in order to coordinate servers and clients located in different time zones. Where the server receives a retrieval request for fragment ID 894645, it uses row 801 to determine access permissions for this fragment.

While FIG. 8 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

FIG. 9 is a table diagram showing sample contents of a fragment version table used by the facility in some embodiments to store information about fragment versions. In particular, the facility uses the fragment version table to identify the different versions of a fragment that exist, and their time order. In some embodiments, the facility maintains only a single version of each fragment, in which case the fragment version table is not necessary, and fragment IDs are substituted for fragment version IDs in other tables maintained by the facility. The fragment version table 900 is made up of rows such as rows 901-903 each corresponding to a different fragment version. Each of the rows is divided into the following columns: a fragment version ID column 911 containing a fragment version ID for the fragment version to which the row corresponds that uniquely identifies this fragment version; a fragment ID column 912 containing the fragment ID identifying the fragment to which this fragment version corresponds; and an update time column indicating the time at which the fragment version was last updated. For example, row 901 indicates that the fragment version having fragment version ID 65489151 corresponds to the fragment having fragment ID 894645, and was last updated at 9/15/2002 9:17:12. Where the server receives a retrieval request for fragment ID 894645, it uses rows 901 and 902 to identify the two fragment versions that exist for this fragment ID. These two rows can also be used to determine which of the fragment versions is more recent.

In some embodiments, where fragment versions are used, some fragment versions are writeable, such that an author can change the content at a time after it is created, at least in the case of fragment versions that are not referenced by any pinned fragment references. However, in some embodiments, every fragment version is read-only, and any revision of content contained by an existing fragment version causes the facility to create a new fragment version. In various embodiments, the creation of a new fragment version occurs at various levels of granularity, including a new fragment version for each editing session, a new fragment version for each keystroke, or at some level in between, such as every five seconds, every minute, every 15 minutes, etc.

FIG. 10 is a table diagram showing sample contents of a fragment version instance table used by the facility in some embodiments to store information about fragment version instances. In particular, the facility uses the fragment version instance directory table to identify, for particular fragment version, instances of the fragment version that are stored on different servers, so that the facility can choose one of the fragment versions for retrieval, and so that, if a fragment version is being changed in an embodiment where this is possible, every instance of it can be changed or invalidated. The fragment version instance directory table 1000 is made up of rows such as rows 1001-1008 each corresponding to a different combination of a fragment version and a server on which an instance of the fragment version is stored. Each row is divided into the following columns: a fragment version ID column 1011 containing if fragment version ID identifying the fragment version; and a server ID column 1012 identifying a server on which an instance of the fragment version is stored. For example, row 1001 indicates that the fragment version having fragment version ID 12345498 has an instance stored on the server having server ID 9103. In various embodiments, the facility uses various other approaches to identifying locations in which instances of fragment versions are stored, such as by using data center IDs, storage device IDs, etc.

FIG. 11 is a table diagram showing sample contents of a fragment version instance content table used by the facility in some embodiments to store fragment version instance content. The fragment version instance content table 1100 is made up of rows such as rows 1101-1103 each corresponding to fragment version instances all stored on a particular server. The fragment version instance content table 1100 is, in particular, stored on the server having server ID 9103. Each of the rows is divided into the following columns: a fragment version ID column 1111 containing the fragment version ID identifying the fragment version to which the row corresponds; an update time column 1112 indicating the time at which the fragment version instance was last updated; and a fragment contents column 1113 containing the contents of the fragment version instance. For example, row 1101 indicates that the fragment version instance having fragment version ID 91285817 and update time 1/16/1987 16:02:54 contains particular image data. It is the fragment 1113 that contains the data that the facility returns in response to a fragment retrieval request.

In some embodiments, rather than storing each fragment version instance as a single entity as shown in FIG. 11, the facility employs an "erasure coding" technique in which it distributes the contents of each fragment version instance as any number of smaller shreds, which can be stored on any arrangement of servers.

Content Transformation Lenses

FIGS. 12-17 illustrate an example in which a table to bar graph lens is imposed on a table fragment.

Figure 12:
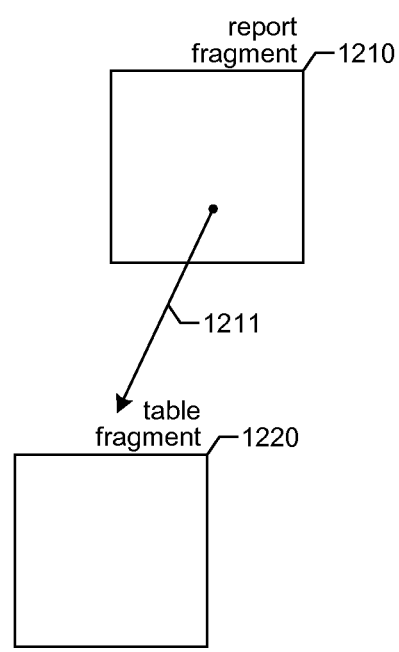
FIG. 12 is a data structure diagram showing the fragment graph for a sample report document that incorporates a table fragment.

FIG. 12 is a data structure diagram showing the fragment graph for a sample report document that incorporates a table fragment. A root fragment 1210 most centrally representing the report document contains a fragment reference 1211 to a table fragment 1220. The fragment reference does not initially impose any lenses on the table fragment.

FIG. 13 is a display diagram showing a materialized view of the report document whose fragment graph is shown in FIG. 12. The view 1300 includes text 1301 specified in the report fragment, as well as a table 1310 specified by the table fragment. The table includes three dollar values: a dollar value 1311 of $1000, a dollar value 1312 of $2000, and a dollar value 1313, $3000, that is calculated on the basis of dollar values 1311 and 1312.

Figure 14:
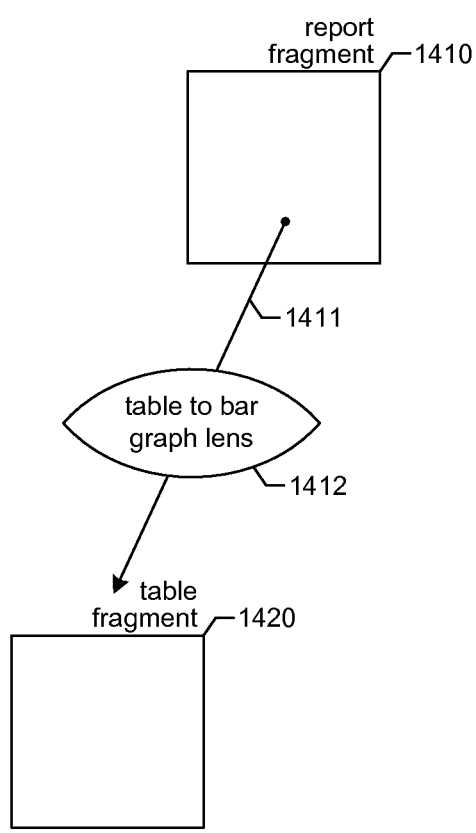
FIG. 14 is a data structure diagram showing a fragment graph for the report document modified from the one shown in FIG. 12 in order to impose a table to bar graph lens on the table fragment.

FIG. 14 is a data structure diagram showing a fragment graph for the report document modified from the one shown in FIG. 12 in order to impose a table to bar graph lens on the table fragment. It can be seen in FIG. 14 that fragment reference 1411 from the report fragment 1410 to the table fragment 1420 includes a lens 1412 for transforming a table into a bar graph. Imposition of this lens impacts the materialized view of the document shown in FIG. 13, as illustrated by FIG. 15.

Figure 15:
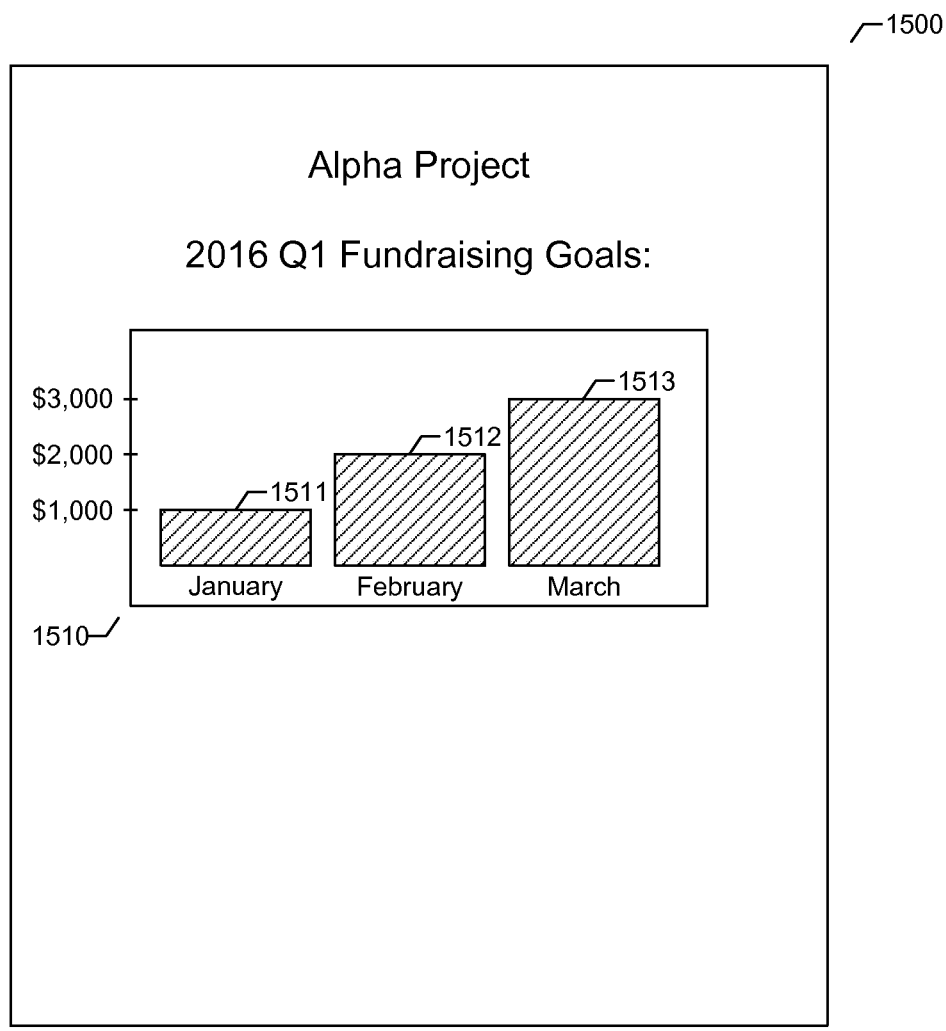
FIG. 15 is a display diagram showing sample contents of a materialized view of the report document updated to reflect the imposition of the table to bar graph lens on the table fragment.

FIG. 15 is a display diagram showing sample contents of a materialized view of the report document updated to reflect the imposition of the table to bar graph lens on the table fragment. The view 1500 includes a bar graph representation 1510 of the dollar values 1311-1313 shown in the table in FIG. 13: a bar representation 1511 of dollar value 1311, $1000; a bar representation 1512 of dollar value 1312, $2000; and a bar representation 1513 of dollar value 1313, $3000. In some embodiments, the user may manipulate the bars 1511-1513 shown in the bar graph in order to alter the underlying dollar values.

Figure 16:
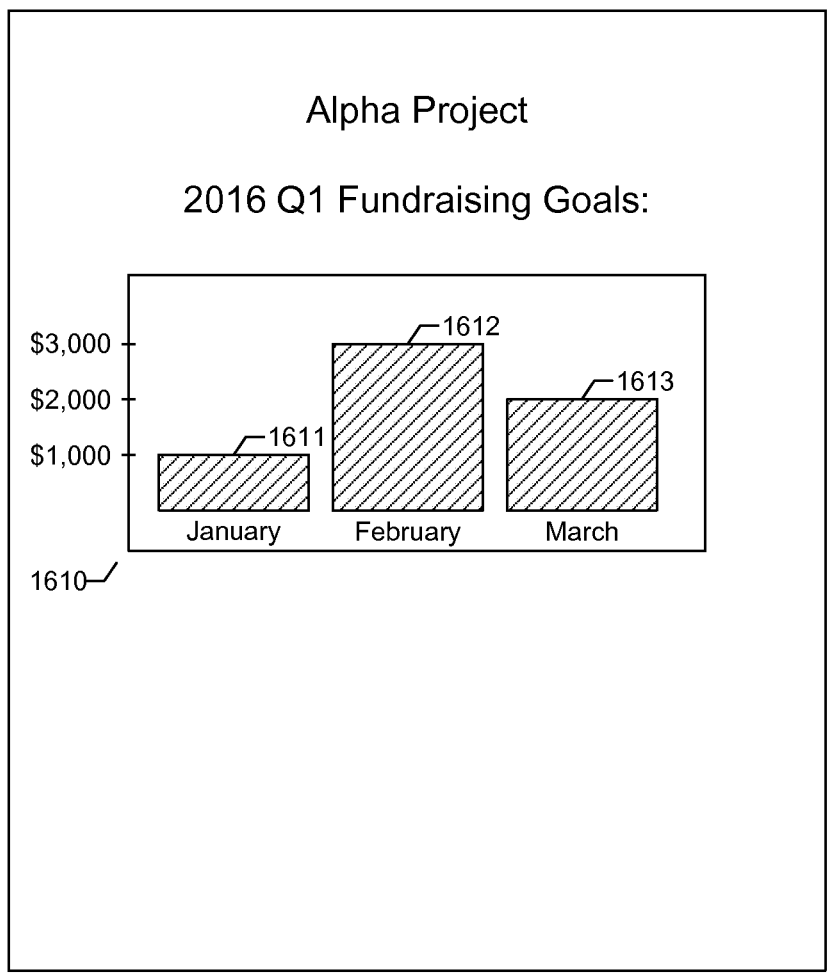
FIG. 16 is a display diagram showing a materialized view reflecting a change in height of the bars of the bar graph.

FIG. 16 is a display diagram showing a materialized view reflecting a change in height of the bars of the bar graph. In particular, while the display shown in FIG. 15 is active, a user has dragged the top of the February bar 1512 to a height of $3000, shown as bar 1612 in FIG. 16. This has an initial effect of changing the underlying dollar value 1312 for February from $2000 to $3000. This in turn has, via the formula for dollar value 1313, changed this dollar value from $3000 to $2000. Finally, this new dollar value for March, $2000, is reflected in the height of bar 1613 shown in FIG. 16.

With the document in the state shown in FIG. 16, the user may remove the lens from the fragment graph shown in FIG. 14 to return to the fragment graph shown in FIG. 12. In response, the facility reverts the bar graph to original table form, as illustrated by FIG. 17.

FIG. 17 is a display diagram showing a rematerialized view of the document reflecting the removal of the table to bar graph lens from the fragment graph. By comparing FIG. 17 to FIG. 13, it can be seen that the textual version of dollar value 1312, $2000, has changed to dollar value 1712, $3000. Similarly, dollar value 1313, $3000, has changed to dollar value 1713, $2000, thus reflecting the changes to these dollar values that were affected by changing the height of the bars in the bar graph representation that was active when the table to bar graph lens was imposed within the fragment graph.

FIGS. 18-23 illustrate an example in which a text fragment is subjected to a stack of multiple lenses.

Figure 18:
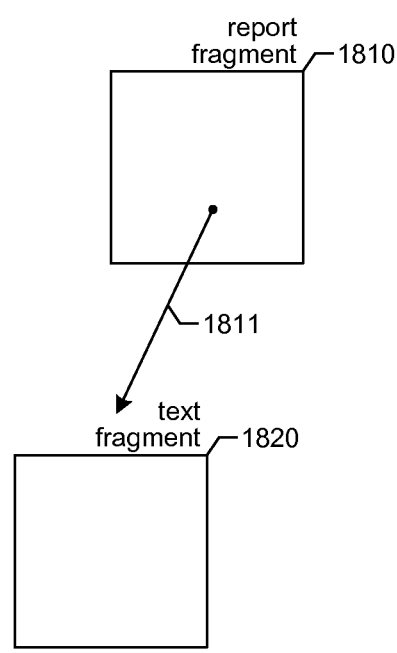
FIG. 18 is a data structure diagram showing an initial fragment graph for a report document that incorporates a text fragment.

FIG. 18 is a data structure diagram showing an initial fragment graph for a report document that incorporates a text fragment. In this fragment graph, a root report fragment 1810 contains a fragment reference 1811 to a text fragment 1820. The fragment reference 1811 initially imposes no lenses.

Figure 19:
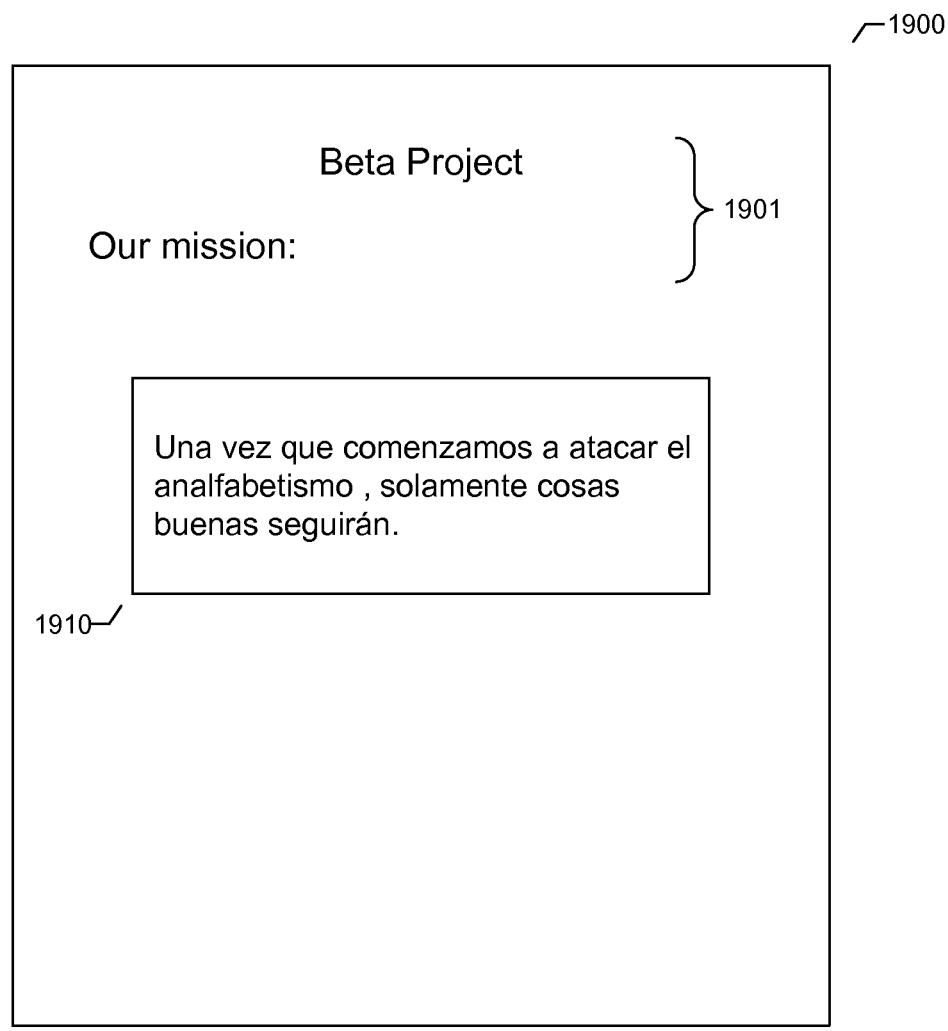
FIG. 19 is a display diagram showing an initial materialized view of the report document whose fragment graph is shown in FIG. 18.

FIG. 19 is a display diagram showing an initial materialized view of the report document whose fragment graph is shown in FIG. 18. The view 1900 includes text 1901 specified by the report fragment. It further contains text 1910 specified by the text fragment. It can be seen that the text 1910 specified by the text fragment is in the Spanish natural language.

Figure 20:
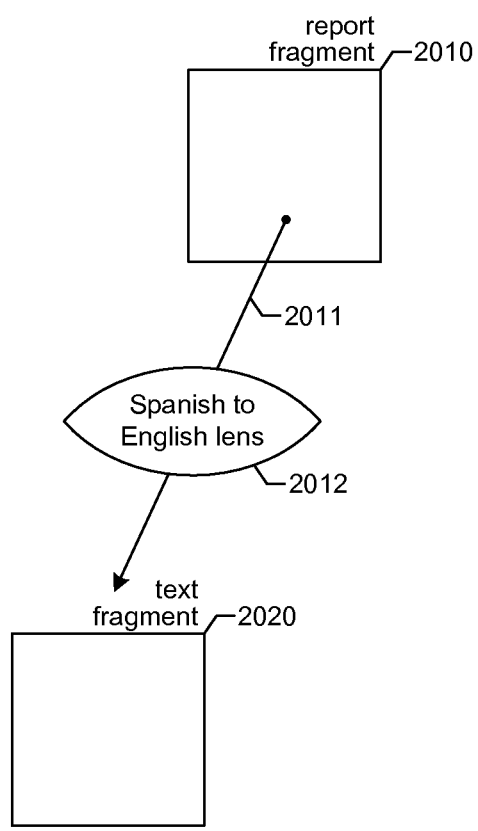
FIG. 20 is a data structure diagram showing a fragment graph for the report document modified from the one shown in FIG. 18 in order to impose a Spanish to English lens on the text fragment.

FIG. 20 is a data structure diagram showing a fragment graph for the report document modified from the one shown in FIG. 18 in order to impose a Spanish to English lens on the text fragment. It can be seen in FIG. 20 that the fragment reference 2011 from the report fragment 2010 to the text fragment 2020 now includes a Spanish to English lens 2012 for performing natural language translation.

Figure 21:
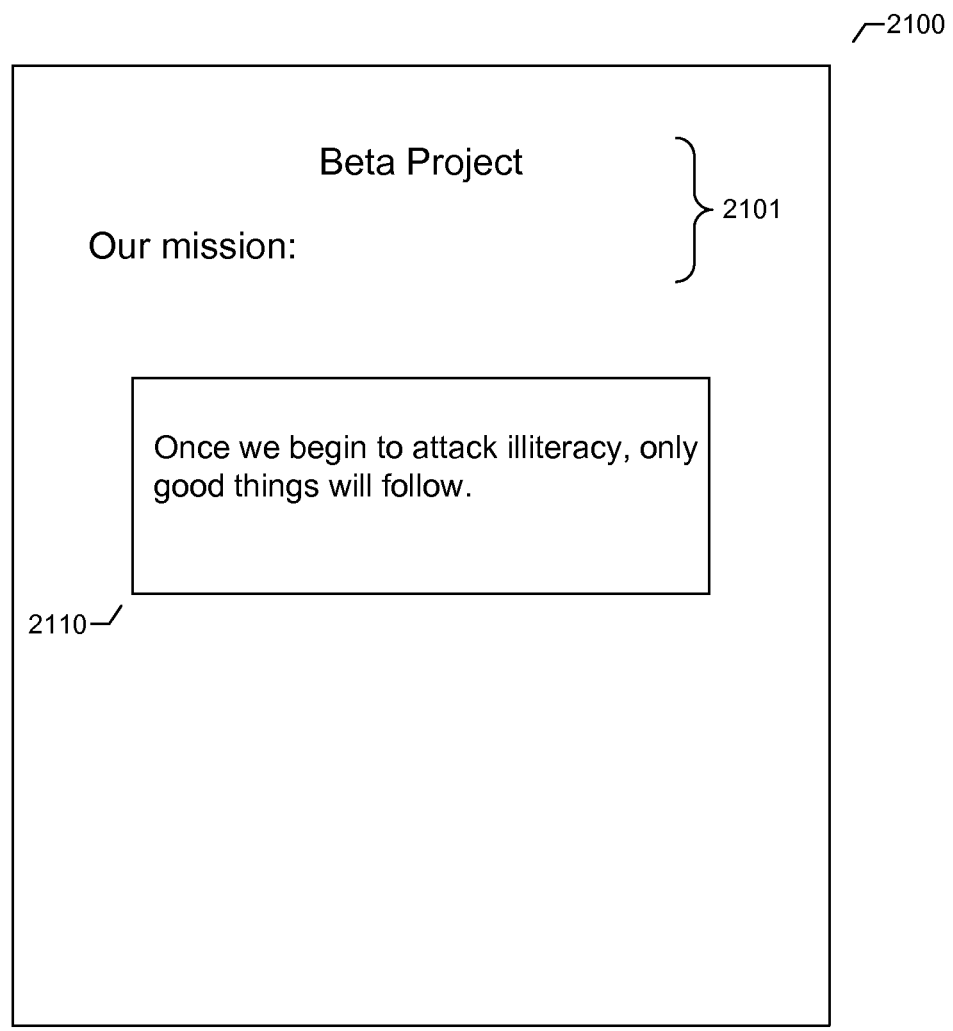
FIG. 21 is a display diagram showing a materialized view of the report document that has been updated to reflect the imposition of the Spanish to English lens on the text fragment.

FIG. 21 is a display diagram showing a materialized view of the report document that has been updated to reflect the imposition of the Spanish to English lens on the text fragment. It can be seen in view 2100 that the text specified by the text fragment has been translated into English 2110 as a result of the imposition of the Spanish to English lens.

Figure 22:
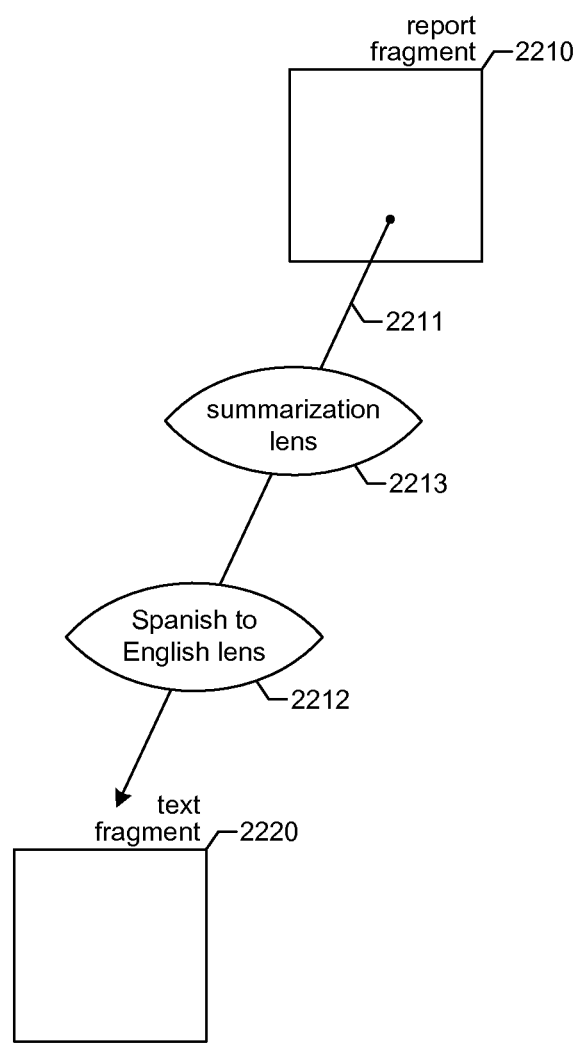
FIG. 22 is a data structure diagram showing the fragment tree of FIG. 20, further revised to also impose a natural language summarization lens on the text fragment.

FIG. 22 is a data structure diagram showing the fragment tree of FIG. 20, further revised to also impose a natural language summarization lens on the text fragment. By comparing FIG. 22 to FIG. 20, it can be seen that, in addition to the Spanish to English lens 2212, the fragment reference 2211 also imposes a summarization lens 2213 on the text fragment 2220.

Figure 23:
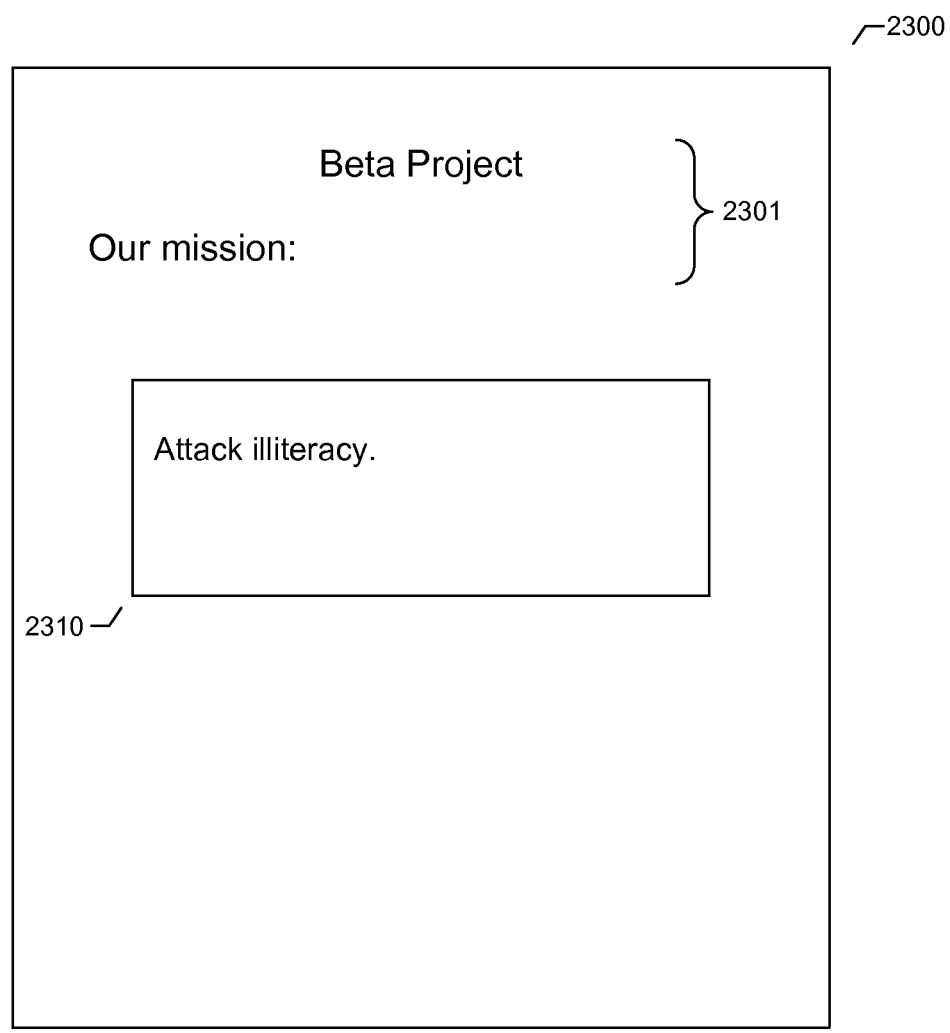
FIG. 23 is a display diagram showing a materialized view of the report document updated to reflect imposition of the summarization lens on the text fragment.

FIG. 23 is a display diagram showing a materialized view of the report document updated to reflect imposition of the summarization lens on the text fragment. It can be seen in display 2300 that first the Spanish to English lens has been applied to the text fragment to translate the Spanish text shown in FIG. 19 into the English text shown in FIG. 21, then the summarization lens has been applied to the English text shown in FIG. 21 to summarize this text, the result of which is shown as text 2310 in FIG. 23. In some embodiments, as illustrated by FIG. 23, the lenses may be applied in the order in which they were imposed. In some embodiments, a user may specify the order in which a stack of lenses is imposed. For example, the user may decide that he or she would rather have the natural language summarization occur prior to the translation. In some embodiments, the facility infers an order in which to impose lenses in a stack. For example, the facility infers an order based on a prior lens order used by this and/or other users; a set of rules indicating a preferred lens order; etc.

Figure 24:
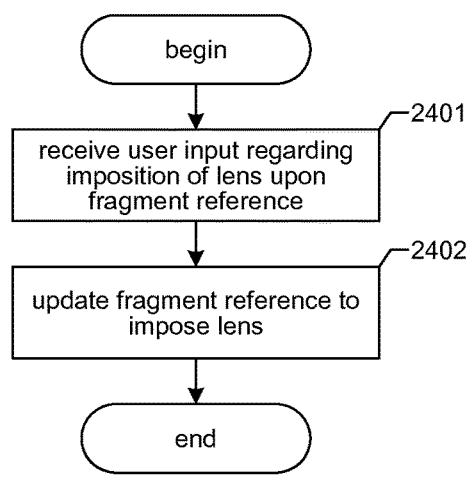
FIG. 24 is a flow diagram showing steps typically performed by the facility in some embodiments in order to impose a lens on the document fragment.
Figure 25:
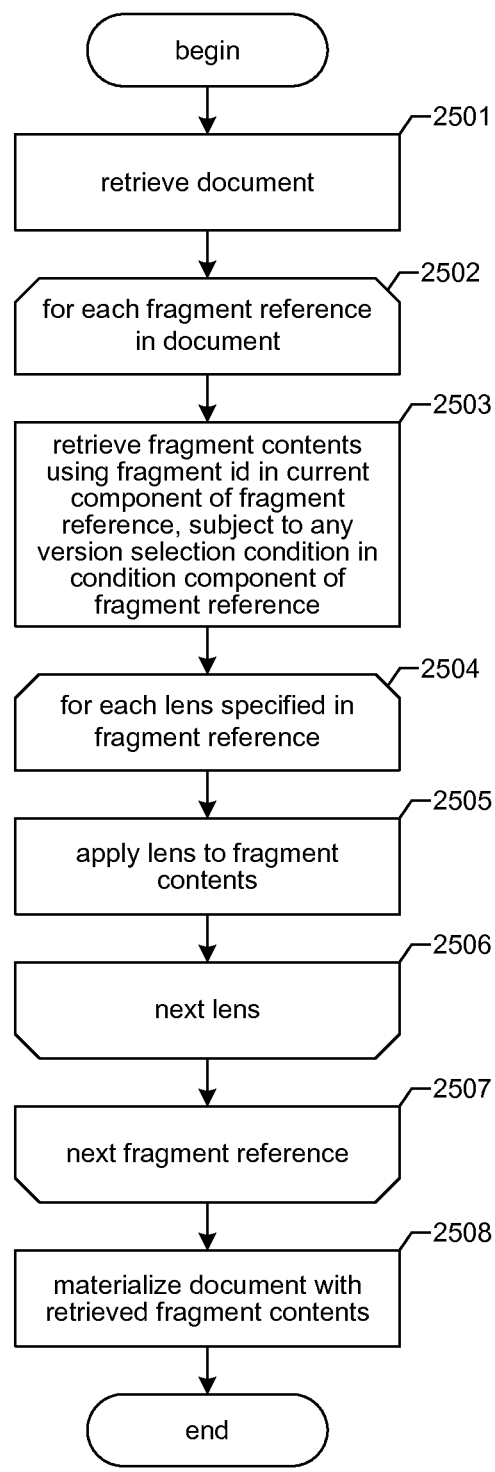
FIG. 25 is a flow diagram showing steps typically performed by the facility in some embodiments in order to materialize the document in which one or more lenses are imposed on incorporated fragments.

FIGS. 24 and 25 are flow diagrams showing steps performed by the facility in some embodiments.

FIG. 24 is a flow diagram showing steps typically performed by the facility in some embodiments in order to impose a lens on the document fragment. In step 2401, the facility receives user input regarding imposition of the lens upon a fragment reference incorporating a fragment into another fragment. In various embodiments, this user input may be received at the time the fragment reference is being added, or at a time after the fragment reference has been added. In some embodiments, the facility receives the user input prior to the fragment reference being added. For example, the user may set up a predefined rule specifying that any time a graph fragment is incorporated, a bar graph lens is to be applied. In some embodiments, the user input includes user input representing one or more actions having the effect of selecting a particular type of lens. In some embodiments, the user input received in step 2401 contains additional information to configure the lens. For example, while in some embodiments the facility uses a different natural language translation lens for each ordered pair of natural languages to be translated, in some embodiments the facility uses a generic natural language translation lens that the user receives to configure with the identities of the source and target natural language for the translation. In some embodiments, step 2401 receives user input specifying an order in which a stack of multiple lenses represented in the fragment reference is to be applied. In step 2402, the facility updates the fragment reference for which the lens was received to impose the lens on this fragment reference, and ultimately the referenced fragment. After step 2402, these steps conclude.

FIG. 25 is a flow diagram showing steps typically performed by the facility in some embodiments in order to materialize the document in which one or more lenses are imposed on incorporated fragments. It can be seen by comparing FIG. 25 to FIG. 7 that these two figures generally correspond. In particular, steps 2501, 2502, 2503, 2507, and 2508 shown in FIG. 25 correspond to steps 701, 702, 703, 704, and 705, respectively, shown in FIG. 7. FIG. 25 further includes steps 2504-2506, representing a loop embedded in the loop represented in steps 2502-2507. In particular, in the loop represented by steps 2504-2506, the facility applies each lens specified in a particular fragment reference being processed in the loop represented by steps 2502-2507 to the content of the fragment specified in the fragment reference. Accordingly, the materialized document ultimately contains the result of applying all of the lenses imposed on the fragments making up the document. In some embodiments (not shown), rather than performing the processing shown in FIG. 25 in a loop, the facility performs it as a recursive descent of a tree-like graph with lenses acting as parents of content nodes, and modifying rendering behavior as the document is materialized.

In some embodiments, the facility provides a computing system for authoring a document. The computing system comprises: a user input subsystem configured to (1) receive first user input identifying content to be included in the document, the identified content being in a first form, and (2) receive second user input specifying a transformation operation to be performed on the identified content in order to transform the identified content from the first form into a second form; and a materialization subsystem configured to apply the specified transformation operation to transform the identified content from the first form into the second form for display. Each of these subsystems in a computing-related entity, comprising either hardware, a combination of hardware and software, software, or software in execution on a computer.

In some embodiments, the facility provides a computer-readable medium having contents configured to cause a computing system to, in order to materialize a document: retrieve information specifying contents of the document, the retrieved information including a transformation specification, the transformation specification both (1) identifying content within the document that is to be the subject of a transformation operation and (2) specifying a transformation operation that is to be performed upon the identified content; cause the transformation operation specified by the transformation specification to be applied to the content identified by the transformation specification in order to transform the content identified by the transformation specification; and cause to be displayed contents of the document including the content identified by the transformation specification as transformed by the transformation operation specified by the transformation specification.

In some embodiments, the facility provides a computer-readable medium storing a document data structure representing a document, the data structure comprising: first information specifying native content of the document; and second information constituting a content incorporation reference specifying incorporation into the document of content stored separately from the document, the second information comprising: a reference usable to retrieve the content stored separately from the document, and third information specifying at least one transformation function to be performed on the content stored separately from the document as part of its incorporation into the document, such that the contents of the data structure are usable to materialize the document to contain both the native content of the document and the content stored separately from the document as transformed by the at least one transformation function.

CONCLUSION

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computing system for authoring a document, comprising:
a processor; and
a memory,
the processor configured to execute instructions stored in the memory to
receive first user input identifying content to be included in the document, the identified content being in a first display form,
receive second user input specifying a plurality of transformation operations to be performed on the identified content in order to transform the identified content from the first display form into a second display form,
automatically determine an order in which the specified plurality of transformation operations are to be performed by applying a set of rules to the plurality of transformation operations, the set of rules indicating an order for different types of transformation operations,
apply the specified transformation operations in the determined order to transform the identified content from the first display form into the second display form for display, wherein applying the specified transformation operations includes modifying a materialized view of the identified content;
displaying the materialized view of the identified content in the second display form with a visual indication marking the identified content within the document receiving application of the specified transformation operations;
receiving user input via the visual indication to alter the application of the specified transformation operations to different content within the document;
applying the specified transformation operations in the determined order to transform the identified different content from the first display form into the second display form for display; and
displaying the materialized view of the identified different content in the second display form.

2. The computing system of claim 1 wherein the first user input identifies a data structure external to the document from which the identified content is available for retrieval.

3. The computing system of claim 1 wherein the first user input literally conveys the identified content.

4. The computing system of claim 1 wherein the processor is further configured to receive third user input specifying a second order among the plurality of transformation operations in which the plurality of transformation operations is to be performed.

5. The computing system of claim 1, wherein the processor is further configured to execute instructions stored in the memory to infer a second order among the plurality of transformation operations in which the plurality of transformation operations is to be performed based on a prior order of transformation operations used by a user providing the second user input.

6. The computing system of claim 1 wherein the processor is further configured to execute instructions stored in the memory to receive the second user input with respect to a displayed literal representation of the content identified by the first user input.

7. The computing system of claim 1 wherein the processor is further configured to execute instructions stored in the memory to receive the second user input with respect to a displayed structural representation of the content identified by the first user input.

8. The computing system of claim 1 wherein the processor is further configured to execute instructions stored in the memory to receive third user input specifying at least one edit to the identified content in the second display form, and edit the identified content in the second display form for display in accordance with the at least one edit specified by the third user input.

9. The computing system of claim 8, wherein the processor is further configured to execute instructions stored in the memory to store the identified content as edited in the first display form.

10. The computing system of claim 1 wherein the first display form includes a textual display form of the identified data and the second display form includes a graphical display form of the identified data and wherein the third user input includes a manipulation of a graphical aspect of the identified content as displayed in the second display form.

11. A non-transitory computer-readable medium, the computer-readable medium having contents configured to cause a computing system to, in order to materialize a document:
retrieve information specifying contents of the document, the retrieved information including a transformation specification, the transformation specification both (1) identifying content within the document that is to be the subject of a transformation operation and (2) specifying a transformation operation that is to be performed upon the identified content;
cause the transformation operation specified by the transformation specification to be applied to the content identified by the transformation specification in order to transform the content identified by the transformation specification;
cause to be displayed contents of the document including the content identified by the transformation specification as transformed by the transformation operation specified by the transformation specification;
cause to be displayed simultaneously with the content identified by the transformation specification as transformed by the transformation operation specified by the transformation specification a visual indication of the transformation operation visually marking the content within the document receiving application of the specified transformation operation;
cause, in response to receiving user input via the visual indication to alter the application of the transformation operation to different content within the document, the transformation operation indicated by the visual indication to be applied to the different content within the document; and
cause to be displayed the contents of the document including the different content as transformed by the transformation operation specified by the transformation specification.

12. The computer-readable medium of claim 11 having contents further configured to cause the computing system to, in response to a user interaction with the displayed visual indication of the transformation operation, remove the transformation specification from the content identified by the transformation specification.

13. The computer-readable medium of claim 11 having contents further configured to cause the computing system to, in response to a user interaction with the displayed indication of the transformation operation, alter the transformation specification to specify a different transformation operation.

14. A non-transitory computer-readable medium, the computer-readable medium storing a document data structure representing a document, the data structure comprising:
first information specifying native content of the document; and
second information constituting a content incorporation reference specifying incorporation into the document of content stored separately from the document, the second information comprising:
a reference usable to retrieve the content stored separately from the document,
third information specifying a plurality of transformation functions to be performed on the content stored separately from the document as part of its incorporation into the document, wherein each of the plurality of transformation functions changes a display form of the native content of the document, and
fourth information specifying an order in which the plurality of transformation functions specified by the third information are to be performed, wherein the fourth information includes a set of rules indicating an order for different types of transformation functions,
such that the contents of the data structure are usable to materialize the document to contain both the native content of the document and the content stored separately from the document as transformed by the plurality of transformation functions in an order determined based on the set of rules and to display a visual indication within the document as materialized to visually mark content included in the document receiving application of each of the plurality of transformation functions, wherein each visual indication is movable by a user to alter the application of the transformation function associated with the visual indication to different content within the document as materialized.

15. The computer-readable medium of claim 14 wherein the reference among the second information is a document fragment identifier usable to retrieve the content stored separately from the document from a geographically-distributed online service.

16. The computer-readable medium of claim 15 wherein the data structure is a document fragment that can be retrieved from the online service using a document fragment identifier different from the document fragment identifier among the second information.

17. The computer-readable medium of claim 14 wherein the third information specifies a plurality of transformation functions, and wherein the third information further indicates a human-specified order among the plurality of transformation functions.

18. The computer-readable medium of claim 14 wherein the third information specifies a plurality of transformation functions, and wherein the third information further indicates an automatically-inferred order among the plurality of transformation functions based on a prior order of transformation functions used by a user providing the plurality of transformation functions.

19. The computer-readable medium of claim 14 wherein the third information specifies a transformation function selected from among a data charting transformation function, a natural language summarization transformation function, and a natural language translation transformation function.

20. A method in a computing system for authoring a document, comprising:

displaying content included in the document;

simultaneous with the display of the content included in the document, displaying a palette comprising, for each of a plurality of transformation operations, a distinct visual indication of the transformation operation;

receiving user input dragging a distinguished one of the displayed visual indications to a point within the displayed content included in the document and displaying the distinguished one of the displayed visual indications at the point within the displayed content;

in response to receiving the user input, storing an indication that the transformation operation indicated by the distinguished visual indication has been applied to a portion of the content included in the document represented by a spatial region of the displayed content that includes the point; and receiving user input with respect to the distinguished one of the displayed visual indications displayed at the point within the displayed content to alter the application of the distinguished one of the displayed visual indications to a different portion of the content included in the document.

21. The method of claim 20, further comprising:

in response to receiving the user input:

applying the transformation operation indicated by the distinguished visual indication to the portion of the content included in the document; and redisplaying the representation of some or all of the content included in the document to reflect application of the transformation operation indicated by the distinguished visual indication to the portion of the content included in the document.

22. The method of claim 20, further comprising:

in response to receiving the user input, augmenting the display of the representation of some or all of the content included in the document to include a visual signal of the transformation operation indicated by the distinguished visual indication.

23. A memory having contents configured to cause a computing system to perform a method for authoring a document, the method comprising:

displaying content included in the document;

simultaneous with the display of the content included in the document, displaying a palette comprising, for each of a plurality of transformation operations, a distinct visual indication of the transformation operation;

receiving user input dragging a distinguished one of the displayed visual indications to a point within the displayed content included in the document;

in response to receiving the user input, storing an indication that the transformation operation indicated by the distinguished visual indication has been applied to a portion of the content included in the document represented by a spatial region of the displayed content that includes the point;

applying the transformation operation indicated by the distinguished visual indication to the portion of the content included in the document;

redisplaying the representation of some or all of the content included in the document to reflect application of the transformation operation indicated by the distinguished visual indication to the portion of the content included in the document, in response to receiving the user input, augmenting the display of the representation of some or all of the content included in the document to include a visual signal of the transformation operation indicated by the distinguished visual indication;

receiving user input via the visual signal of the transformation operation to alter the application of the transformation operation to different content within the document; and applying the transformation operation to the different content within the document.

* * * * *